(12) United States Patent
Yeung et al.

(10) Patent No.: US 8,112,281 B2
(45) Date of Patent: Feb. 7, 2012

(54) ACCELEROMETER-BASED CONTROL OF WEARABLE AUDIO RECORDERS

(75) Inventors: King-Wah Walter Yeung, Cupertino, CA (US); Wei-Wei Vivian Yeung, Cupertino, CA (US)

(73) Assignee: Enbiomedic, Cupertino, CA (US)

( * ) Notice: Subject to any disclaimer, the term of this patent is extended or adjusted under 35 U.S.C. 154(b) by 651 days.

(21) Appl. No.: 12/337,869

(22) Filed: Dec. 18, 2008

(65) Prior Publication Data
US 2009/0164219 A1 Jun. 25, 2009

(51) Int. Cl.
*G10L 21/00* (2006.01)
(52) U.S. Cl. ........................... 704/270
(58) Field of Classification Search ............. 704/270
See application file for complete search history.

(56) References Cited

U.S. PATENT DOCUMENTS

| | | | |
|---|---|---|---|
| 3,939,640 A | 2/1976 | Kahn | |
| 4,115,995 A | 9/1978 | Brien | |
| 4,717,261 A | 1/1988 | Kita et al. | |
| 5,511,046 A | 4/1996 | Vanderpal | |
| 6,263,836 B1 | 7/2001 | Hollis | |
| 6,513,532 B2 | 2/2003 | Mault et al. | |
| 6,956,564 B1 | 10/2005 | Williams | |
| 7,246,033 B1 | 7/2007 | Kudo | |
| 7,519,271 B2 * | 4/2009 | Strub et al. | 386/326 |
| 7,519,748 B2 * | 4/2009 | Kuzmin | 710/67 |
| 8,050,881 B1 * | 11/2011 | Yeung et al. | 702/89 |

* cited by examiner

*Primary Examiner* — Susan McFadden

(57) ABSTRACT

Accelerometer-based orientation and/or movement detection for controlling wearable audio recorders, such as wrist-worn audio recorders, resulting in button-free operation of the audio recorders. Operating a button-free wearable audio recorder does not rely on conventional switches that are often small, difficult to operate, and not very reliable. A wrist-worn audio recorder can use an accelerometer to detect the natural orientation and/or movement of a user's wrist and subsequently activate a corresponding audio-recorder function, for instance recording or playback, without requiring the user to remember to activate the audio-recorder function. In addition, a wearable audio recorder with a vibration mechanism can use this method to remind a user of an undesirable repeated movement, such as restless leg movement. In such applications, and many others, accelerometer-based control of a wearable audio recorder offers significant advantages over conventional means of control, particularly in terms of ease of use and durability.

15 Claims, 14 Drawing Sheets

ACCELEROMETER-BASED CONTROL OF WEARABLE AUDIO RECORDERS

CROSS-REFERENCE TO RELATED APPLICATIONS

This application claims the benefit of provisional application Ser. No. 61/008,504, filed Dec. 19, 2007 by the present inventors.

FEDERALLY SPONSORED RESEARCH

Not Applicable

SEQUENCE LISTING OR PROGRAM

Not Applicable

BACKGROUND

1. Field

This application relates to using accelerometer-based orientation and/or movement sensing to control wearable devices, such as wrist-worn audio recorders and wristwatches.

2. Prior Art

Wrist-worn audio recorders can serve a wide range of uses, from recording memos and meetings for professionals to documenting dietary intake and physical activity for health-conscious individuals and chronicling a child's first words and actions for parents. Furthermore, recorded audio messages can be played back at preset times to remind or alert a user, as disclosed in U.S. Pat. No. 5,511,046 to Vanderpal (1996).

These wrist-worn audio recorders, wristwatches, and related devices are generally controlled through one or more of the following means: electromechanical switches, voice activation, and motion activation.

Switches are commonly used to control functions such as audio recording and playback on devices like electronic wristwatches (as described in U.S. Pat. No. 4,717,261 to Kita et al. (1988)) and, more recently, wrist-worn watch/MP3 players (for example, the Xonix MP3 recorder watches manufactured by Xonix Electronic Watch Co., Ltd., Zhuhai, China). They are also used to report the time in talking watches. However, these switches are often small, difficult to operate, and not very reliable, which may lead to premature failure of the audio recorder or talking watch. In addition, using switches can be inconvenient for recording many brief personal messages, because the user has to remember to turn the audio recorder on and off in order to record each message.

Voice-activated recording mechanisms offer more convenience since they facilitate convenient recording of personal messages only when the user wants to record, without relying on the user's active attention to physically turn the audio reorder on and off during a recording session. However, irrelevant audio signals in the surrounding can still turn on a voice-activated mechanism.

Finally, motion activation has also been used to operate wristwatches. U.S. Pat. No. 3,939,640 to Kahn (1976) describes using a motion-activated switch inside a wristwatch to turn on or off the illumination of a wristwatch display. A free-rolling heavy ball within the container of the switch strikes a spring to cause conduction of electrical current when the wrist rotates rapidly. Additionally, U.S. Pat. No. 4,115,995 to Brien (1978) discloses using a motion-activated switch secured within a wristwatch to set the display on the wristwatch (i.e. to a desired time and date), where quick snaps of the wrist dislodge a metal ball from a magnet and cause conduction of electrical current through the ball. Although these motion-activated switches can be used to turn on and off a wrist-worn device, such as an audio recorder, the rapid motion required to close the electrical switches is unnatural and can cause muscle strain, especially after many repeated actions. Furthermore, it is difficult to add more control functions to a wrist-worn device using only these simple motion-activated on-off switches.

The aforementioned mechanisms for controlling wrist-worn devices leave much to be desired in terms of ease of use and durability. Accelerometer-based methods would offer advantages in these senses, since control can be automatically activated through a user's natural movements, and the user does not need to directly interact with the electromechanical parts of the accelerometer.

In recent years, accelerometers produced with low-cost MEMS (micro-electro-mechanical systems) technology have been used for movement and orientation sensing. For example, the wristwatch described in U.S. Pat. No. 6,513,532 B2 to Mault et al. (2003) uses an accelerometer and a button-controlled audio recorder to monitor physical activity and record dietary consumption, respectively, and U.S. Pat. No. 6,956,564 B1 to Williams (2005) discloses a portable hand-held computer that incorporates two single-axis accelerometers for display control and gesture recognition with small fingertip switches for recording speech notes. In the field of animal behavior monitoring, U.S. Pat. No. 7,246,033 B1 to Kudo (2007) and U.S. Pat. No. 6,263,836 B1 to Hollis (2001) describe the use of accelerometers to monitor pet activity and train dogs, respectively, and both incorporate an audio recorder for recording and playback of a human's voice. However, all of the above accelerometer applications require conventional switches to operate audio recording, so that there still exists a need for the application of accelerometer technology to control recording, playback, time reporting, and other functionality in wrist-worn devices.

SUMMARY

The use of accelerometer-based orientation and movement sensing to control wearable devices, such as wrist-worn audio recorders and wristwatches, is illustrated through three embodiments.

In accordance with a first embodiment, a wrist-worn audio recorder comprises an accelerometer for sensing the orientation and/or movement of the audio recorder. In this embodiment, the audio recorder activates audio recording only when it is in a predetermined orientation and/or after it has completed a predetermined movement. Different predetermined orientations and/or movements (i.e. sequences of accelerometer data) of the audio recorder can be used to activate other functions of the recorder, such as playback, rewinding, or fast forwarding.

In accordance with a second embodiment, a wrist-worn audio recorder comprises an accelerometer for sensing the orientation and/or movement of the audio recorder. In this embodiment, a reminding audio message can be recorded in accordance with the first embodiment or in any other manner. When the audio recorder is worn on a wrist, a leg, or another part of the body, it plays back a reminding audio message after it detects a predetermined orientation and/or movement a predetermined number of times.

In accordance with a third embodiment, a wristwatch comprises an accelerometer for sensing the orientation and/or movement of the wristwatch. In this embodiment, the watch gives an audio report of the time after it detects a predetermined orientation and/or movement.

Although the above embodiments take the form of wrist-worn devices, the methods and apparatus they illustrate can be extended to wearable devices in general, by one skilled in the art and without departing from the spirit and scope of the invention.

DRAWINGS—FIGURES

DETAILED DESCRIPTION

FIGS. 1, 2, 3, and 4—First Embodiment

The use of accelerometer-based orientation and/or movement sensing to control a wearable device is illustrated in a first embodiment with a wrist-worn audio recorder. The wrist-worn audio recorder incorporates an accelerometer for sensing the orientation and/or movement (i.e. either orientation or movement or both) of the audio recorder, and it is activated to record audio messages only when it is in a predetermined orientation and/or after it has completed a predetermined movement. In this embodiment we describe the predetermined orientation and/or movement to be the natural orientation and/or movement for the user to record personal audio messages, so that the user does not need to actively remember to turn the audio recorder on and off, but the predetermined orientation and/or movement can be any other orientation and/or movement. The wrist-worn audio recorder may usually also contain a real-time clock, so that the recorder can provide additional time-keeping function, and in this case the recorded audio data can be synchronized with other time-stamped data, such as video data or accelerometer data from other devices.

Figure 1:
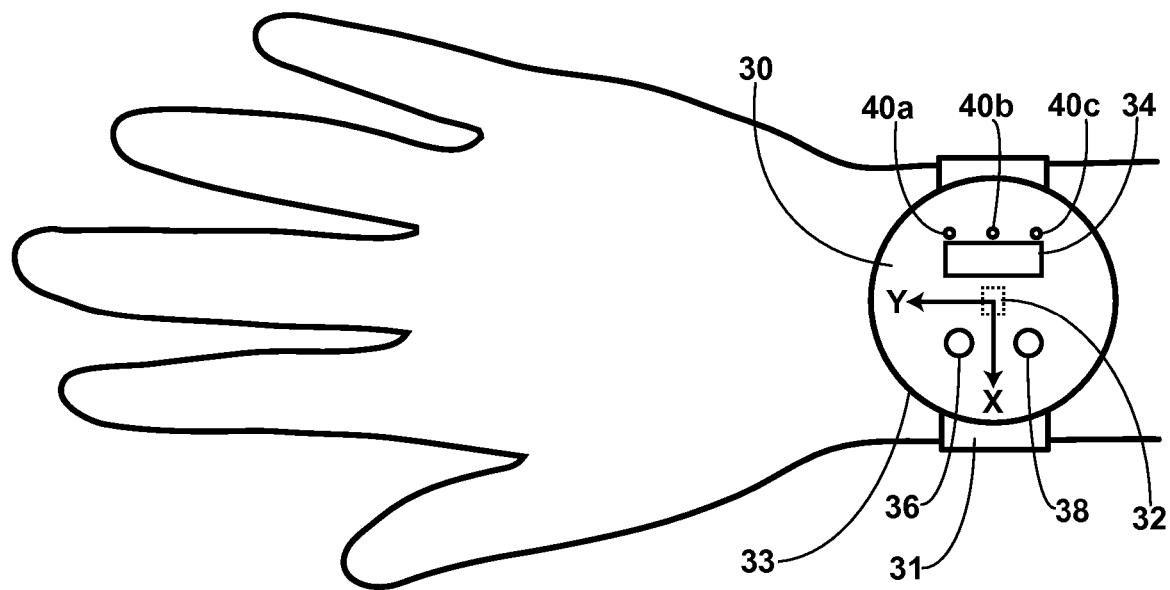
FIG. 1 shows a front view of a wrist-worn audio recorder incorporating a three-axis accelerometer in accordance with the first embodiment, illustrating the X- and Y-axes of the accelerometer.

FIG. 1 shows a front view of a wrist-worn audio recorder 30 incorporating a three-axis accelerometer 32 inside a housing 33 of audio recorder 30. Three-axis accelerometer 32 is commonly also called a triaxial accelerometer, and it senses acceleration in the three orthogonal axes X, Y, and Z. In FIG. 1, the accelerometer 32 is illustrated by a dotted outline, and the Z-axis points out of the figure. Wristband 31 secures audio recorder 30 on top of the user's right wrist (although audio recorder 30 could also be secured on top of the user's left wrist). A display 34 on the front surface of audio recorder 30 shows the time of day (hours, minutes, seconds), the date (month, date, day), or the current status (recording, playback, etc.) of audio recorder 30. Alternatively, the hands for the hours, minutes, and seconds of an analog wristwatch may be used to show the time of day, in place of display 34. Wrist-worn audio recorder 30 can function without a real-time clock, although the inclusion of a real-time clock enables time-stamping of the recorded audio data and facilitates data archiving, data searching, or time synchronization of the data with time-stamped data from other devices.

A microphone 36 is used for audio recording, and a speaker 38 is used for playing back the recorded audio data. When audio recorder 30 is activated for audio recording, indicators 40a, 40b, 40c at the front of housing 33 may be used to inform the user whether the recording is started at the beginning, the end, or somewhere in the middle of the audio-data record. Recording audio data at the beginning or between the beginning and the end of the audio-data record will overwrite previously recorded audio data. Recording at the end is the usual mode of audio recording and will append additional audio data to the end of the audio-data record. Indicators 40a, 40b, 40c can be miniature LEDs (light-emitting diodes), and flashing of an indicator can be used to signal the user that audio recording is in process. Alternatively, the functions of indicators 40a, 40b, 40c can be incorporated into display 34, so that separate indicators 40a, 40b, 40c are not needed.

Figure 2:
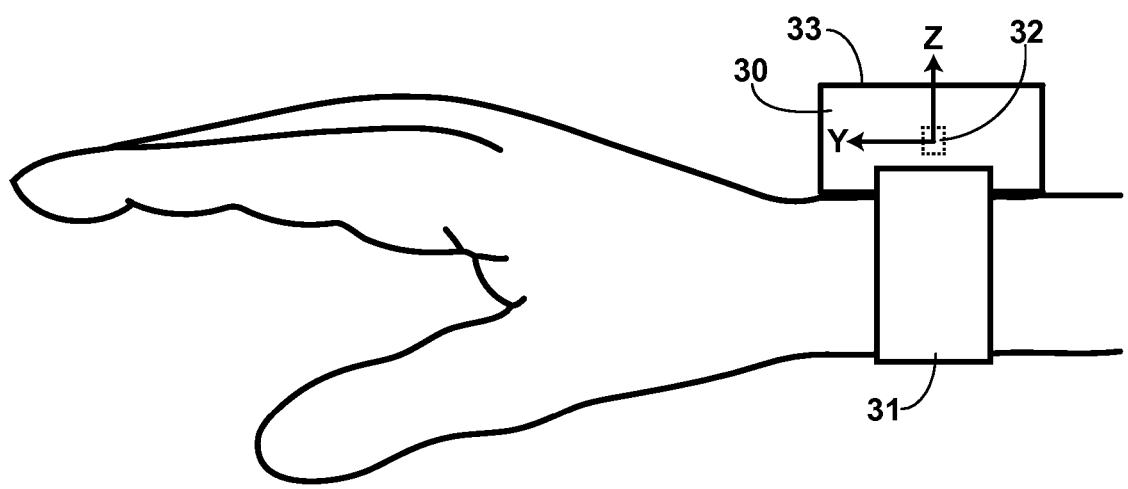
FIG. 2 shows a side view of the wrist-worn audio recorder of FIG. 1, illustrating the Y- and Z-axes of the accelerometer.

FIG. 2 shows a side view of wrist-worn audio recorder 30 with accelerometer 32 (illustrated by a dotted outline) mounted inside housing 33 to sense the orientation and/or movement of audio recorder 30. Audio recorder 30 is secured on top of the wrist, using wristband 31, and the X-axis points out of the figure. Three-axis accelerometers such as accelerometer 32 may be constructed with MEMS (micro-electro-mechanical systems) technology using capacitance measurement to determine the amount of acceleration, and they are available from Freescale Semiconductor, Inc., of Austin, Tex., or other companies. The X-, Y-, and Z-axis signals from a three-axis accelerometer provide information about the accelerometer's movement (which may be determined by a sequence of accelerometer data, for example), and can also be separated into components of the vertical gravitational acceleration G to determine orientation when the accelerometer is at rest, so that a three-axis accelerometer can serve as both an orientation and movement sensor. In this way, audio recorder 30 uses the X-, Y-, and Z-axis acceleration signals of accelerometer 32 to detect specific orientations and/or movements of audio recorder 30 and subsequently activate the corresponding audio-recorder functions. For example, if the user stretches his or her arm out forwards, with the palm of his or her hand facing vertically downwards, accelerometer 32 (as illustrated in FIG. 2) will sense an acceleration of −9.8 meter/$sec^2$ (the gravitational acceleration G is 9.8 meter/$sec^2$ vertically downward) along its Z-axis, because the Z-axis is pointing vertically upward in this orientation. The acceleration signals are zero along its X- and Y-axes, because they are orthogonal to the direction of G. Likewise, an acceleration of 9.8 meter/$sec^2$ (i.e. G) will be sensed along the accelerometer's Z-axis if the palm is facing upwards instead. Other orientations of the wrist will produce acceleration signals with different signs and magnitudes in the X-, Y-, and Z-axis components of accelerometer 32, and the orientation can be computed using standard vector analysis.

Figure 3:
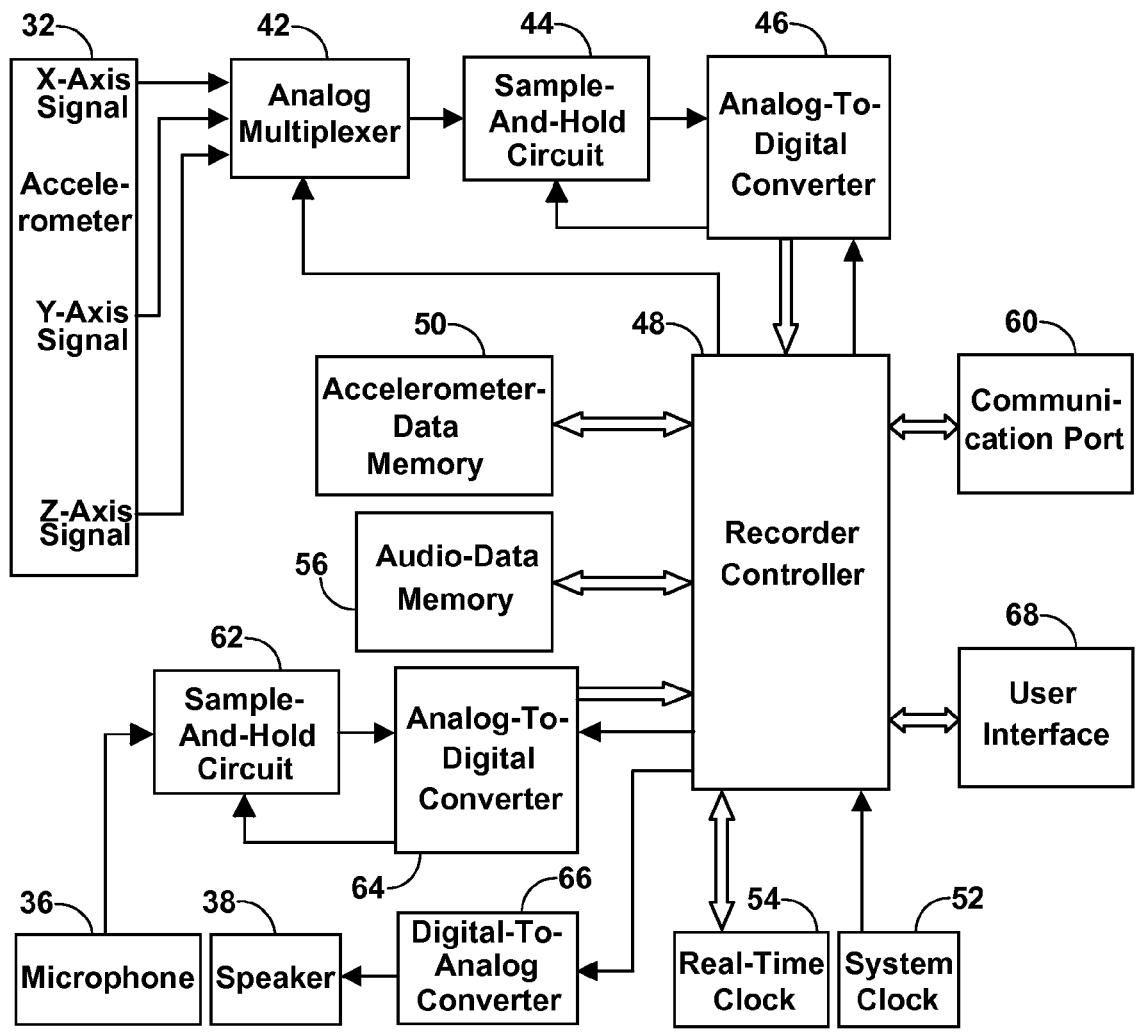
FIG. 3 is a schematic block diagram of the wrist-worn audio recorder of FIG. 1, in accordance with the first embodiment.

FIG. 3 is a schematic block diagram of wrist-worn audio recorder 30 (FIG. 1). Each of the X-, Y- and Z-axis analog signal components of accelerometer 32 is selected by an analog multiplexer 42 at predetermined time intervals, under the control of a recorder controller 48. Recorder controller 48 also activates an analog-to-digital converter 46, which uses a sample-and-hold circuit 44 to sample and hold the selected analog signal component. Analog-to-digital converter 46 converts the sampled analog signal component to the corresponding digital datum and sends the digital datum to recorder controller 48, which stores the digital datum in an accelerometer-data memory 50. Although FIG. 3 shows that accelerometer 32 senses accelerometer signal components in three orthogonal axes, accelerometer 32 may sense signal components in a different number of axes for detection of different predetermined orientations and/or movements. Sample-and-hold circuit 44 and analog-to-digital converter 46 are not required for an accelerometer that produces digital output data for the signal components, and analog multiplexer 42 should be replaced with a digital multiplexer in this case. Furthermore, if accelerometer 32 is a single-axis accelerometer that produces only one signal component, the analog or digital multiplexer is not needed.

A system clock 52 provides the operation timing for recorder controller 48, which is usually a microprocessor. Recorder controller 48 can be configured to perform mathematical computation, logic operation, timer function, storing and retrieving data using an audio-data memory 56 and accelerometer-data memory 50, and reading and sending data through a communication port 60, etc., as well known in the art. A real-time clock 54 provides time-keeping function, and recorder controller 48 can also use real-time clock 54 to time-stamp each section of recorded audio message. In certain designs, real-tine clock 54 is derived from system clock 52, so that a dedicated real-time clock 54 is not required.

A user records audio messages into microphone 36, and the analog audio signal from microphone 36 is converted to digital audio data by a sample-and-hold circuit 62 and an analog-to-digital converter 64. Recorder controller 48 stores the digital audio data in audio-data memory 56, and it can subsequently send the digital audio data to a digital-to-analog converter 66 for playback from speaker 38. Through communication port 60, recorder controller 48 can also send the recorded audio data to a processor (not shown in FIG. 3) for data archiving, data searching, or time synchronization of the data with other time-stamped data, or to an earphone (not shown in FIG. 3) for playback. Audio-data memory 56 and accelerometer-data memory 50 can be RAM (random-access memory), flash memory, removable memory cards, or other types of digital memory. A user interface 68, which includes display 34 (FIG. 1), indicators 40a, 40b, 40c (FIG. 1), and switches if necessary (not shown in FIG. 1), facilitates communication between audio recorder 30 and the user.

Communication port 60 facilitates communication between audio recorder 30 and a processor (not shown in FIG. 3), such as a personal computer, and can send recorded audio data to the processor for playback, data archiving, data searching, or time synchronization of the data with other time-stamped data. Communication port 60 also facilitates transmission of recorded audio data to an earphone (not shown in FIG. 3) for playback. Communication port 60 can be a wired or wireless USB (Universal-Serial-Bus) port, a Bluetooth® (a digital wireless protocol) wireless communication port, or any other wired or wireless communication port.

Figure 4:
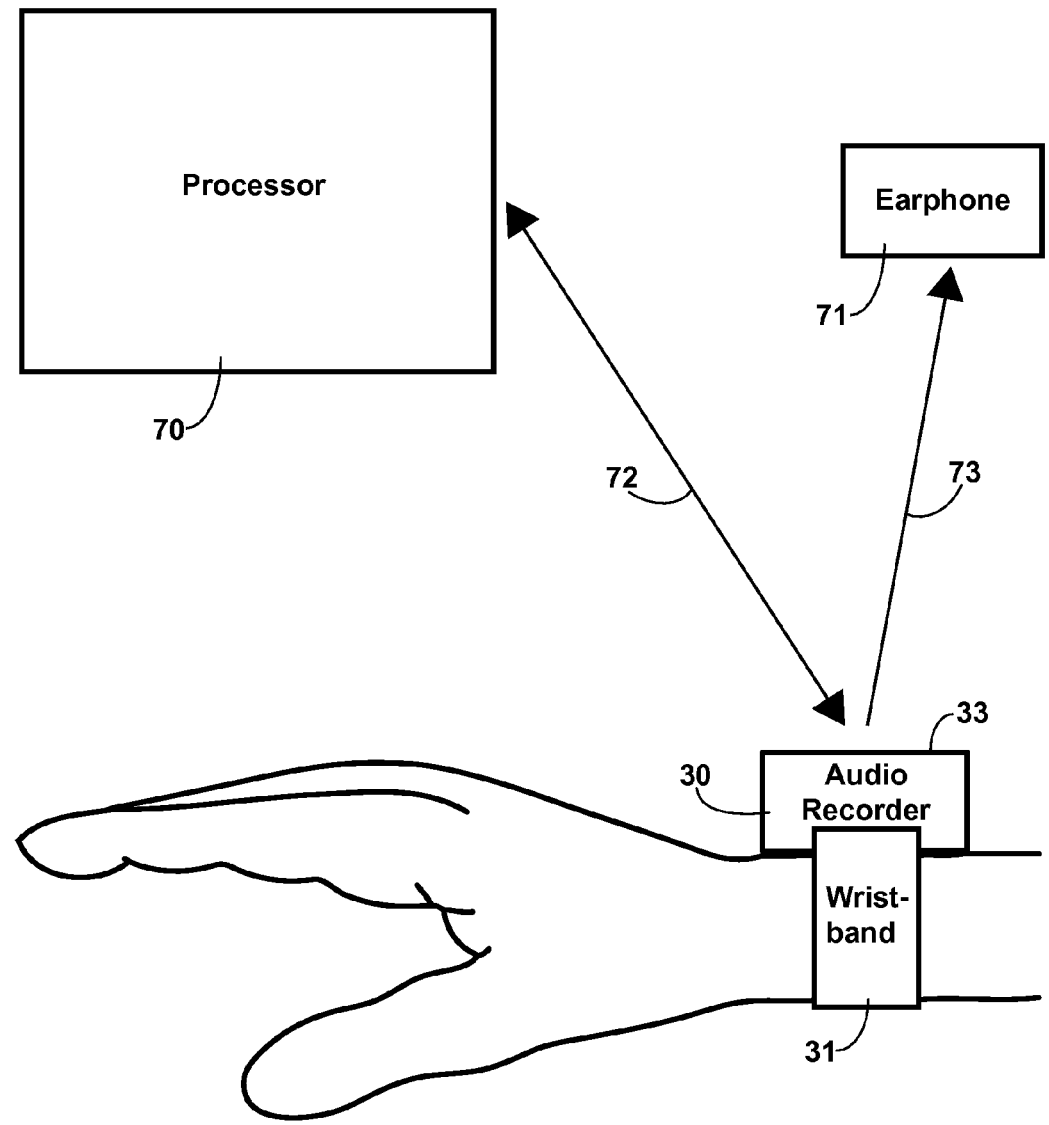
FIG. 4 is a view of the wrist-worn audio recorder in accordance with the first embodiment, schematically illustrating communication between the audio recorder and a processor, and between the audio recorder and an earphone.

FIG. 4 illustrates communication between audio recorder 30 and a processor 70 through a communication link 72, which can be a wired or wireless data link. Communication link 72 can be used to transmit data between audio recorder 30 and processor 70, or for other uses such as sending clock-setting commands from processor 70 to audio recorder 30 to set real-time clock 54 (FIG. 3) of audio recorder 30 to an accurate real-time clock reading. Audio recorder 30 can also transmit recorded audio data to an earphone 71 through a wired or wireless data link 73, such as a Bluetooth® data link. Processor 70 can be a personal computer, a PDA, a cellular phone, or another digital device. Although FIG. 4 shows audio recorder 30, with housing 33, secured to the right wrist by wristband 31, audio recorder 30 can communicate with processor 70 and earphone 71 without being secured to a wrist.

Speech recognition of recorded speech notes is useful in applications such as recording food intake or physical activity, because it minimizes the time and inconvenience otherwise involved if the user needs to manually enter this food and activity data into a processor such as processor 70 to analyze his or her energy balance or fitness status. In these cases, either recorder controller 48 (FIG. 3) can perform the speech recognition, or it can send the audio data to processor 70 for processor 70 to perform the speech recognition. If audio recorder 30 performs the speech recognition, then the time-stamped text messages (obtained from speech recognition of time-stamped audio data) can be stored in audio-data memory 56 (FIG. 3) along with other audio data and sent to processor 70 at a later time.

Detection Operation—FIGS. 5, 6, 7, and 8

Figure 5:
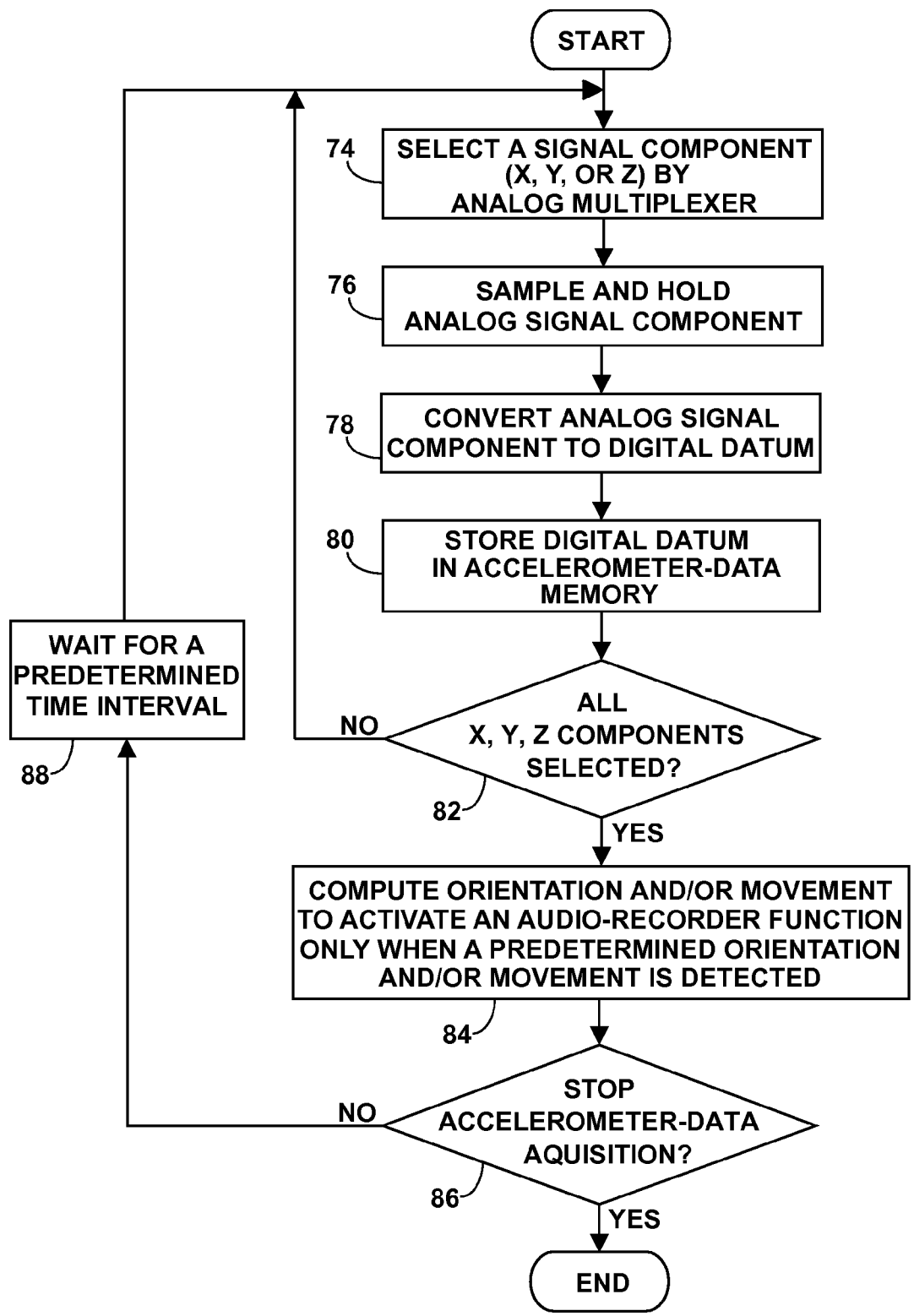
FIG. 5 is a flow diagram illustrating the orientation and/or movement detection operation of a recorder controller of the wrist-worn audio recorder, in accordance with the first embodiment.

FIG. 5 is a flow diagram illustrating the orientation and/or movement (i.e. sequence of acceleration data) detection operation of recorder controller 48 (FIG. 3). In FIG. 5, after analog multiplexer 42, under the control of recorder controller 48, selects an acceleration signal component (X, Y, or Z) at step 74, recorder controller 48 activates analog-to-digital converter 46 (FIG. 3) to use sample-and-hold circuit 44 (FIG. 3) to sample and hold the selected signal component at step 76. At step 78, analog-to-digital converter 46 converts the sampled analog signal component to its corresponding digital datum and sends the digital datum to recorder controller 48, which stores the digital datum in accelerometer-data memory 50 (FIG. 3) at step 80. At step 82, recorder controller 48 repeats this process for the next accelerometer signal component, until the X, Y, and Z signal components have all been selected. If audio recorder 30 does not move too fast over each cycle of accelerometer-data acquisition, the acquired and stored X, Y, and Z signal data in each cycle are approximately simultaneous. Alternatively, separate data acquisition subsystems, each including a sample-and-hold circuit and an analog-to-digital converter, can be used for each of the three accelerometer-signal components to obtain more precisely simultaneous X, Y, and Z accelerometer signal data. At step 84, recorder controller 48 uses the data stored in accelerometer-data memory 50 to compute the orientation and/or movement of audio recorder 30 and activates an audio-recorder function, such as audio recording, playback, or rewinding (the operation of the audio-recorder function is not illustrated in FIG. 5), only if a predetermined orientation and/or movement is detected. At step 86, if the user does not stop the accelerometer-data acquisition, recorder controller 48 waits for a predetermined time interval at step 88 and then returns to step 74 to repeat the above process.

Figure 6:
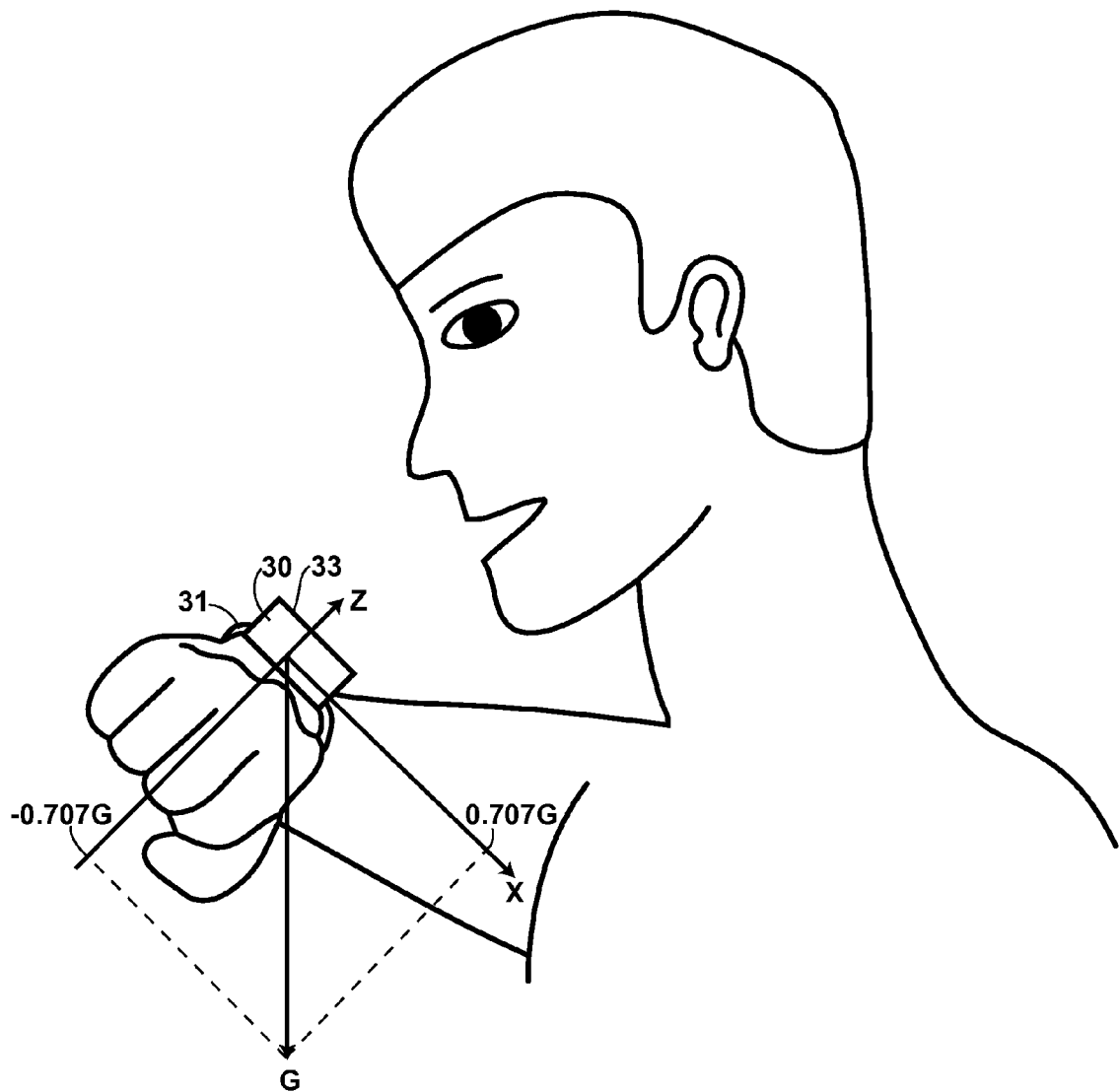
FIG. 6 is a graphical illustration of a possible orientation of the wrist-worn audio recorder for activating audio recording, in accordance with the first embodiment.

FIG. 6 illustrates a possible orientation of audio recorder 30 during audio recording, with audio recorder 30 secured on top of the wrist, using wristband 31. The user naturally positions audio recorder 30 in front of his or her mouth (typically within 8 inches of the mouth, for example), with the front surface of housing 33 of audio recorder 30 facing the mouth. In this specific orientation of audio recorder 30, the Y component of the gravitational acceleration G is small (the Y-axis points away from the figure and is nearly horizontal). Since the angle between the X-axis and the direction of the gravitational acceleration G is about 45 degrees, the X component of the gravitational acceleration G is approximately G cosine 45°, which is equal to 0.707 G, as illustrated in the vector diagram in FIG. 6. Similarly, the angle between the Z-axis and the gravitational acceleration G is about 135°, so that tile Z component of the gravitational acceleration G is G cosine 135°, which is −0.707 G. Recorder controller 48 (FIG. 3) detects this combination of X, Y, and Z signal components to activate audio recording. Alternatively, and for more robust detection, recorder controller 48 can use a machine learning algorithm or other suitable method to detect a predetermined movement, such as the natural movement of lifting the arm upwards from a resting position (i.e. from the side of the body or from in front of the lower end of the torso) and tilting the wrist towards the mouth to activate audio recording.

In the first embodiment, the audio recording function of audio recorder 30 turns on automatically when the user positions audio recorder 30 in a predetermined orientation, such as the natural orientation for recording shown in FIG. 6, and/or after audio recorder 30 has completed a predetermined movement, and an indicator (40a, 40b, or 40c shown in FIG. 1) simultaneously turns on to inform the user that he or she may begin audio recording. A voice-activated mechanism can be added to minimize accidental activation, so that recording is activated only when audio recorder 30 is in the predetermined orientation and/or has completed the predetermined movement and the user begins talking to it. In addition, recorder controller 48 (FIG. 3) of audio recorder 30 can be designed to take the user's position or posture into consideration, so that it activates audio recording after sensing any in a range of signal outputs from accelerometer 32. This range may encompass, for example, audio recorder 30's natural recording orientation in front of the mouth (as shown in FIG. 6) for a range of user postures from standing upright (the posture illustrated in FIG. 6) to lying down. Using these same concepts, recorder controller 48 can also be designed to detect the natural recording orientation of audio recorder 30 for a user who wears audio recorder 30 on the other side (i.e. the bottom) of the wrist. In all cases, the audio recording is stopped as soon as the user moves audio recorder 30 away from the predetermined orientation, so that recording of irrelevant audio information is minimized without requiring the user to consciously turn off the audio recording. Furthermore, a different type of accelerometer, such as a two-axis (also called biaxial) or a single-axis (also called uniaxial) accelerometer, or a combination of the same or different types of accelerometers, can also be used to detect a predetermined orientation of audio recorder 30, instead of using a three-axis accelerometer as illustrated here.

Figure 7:
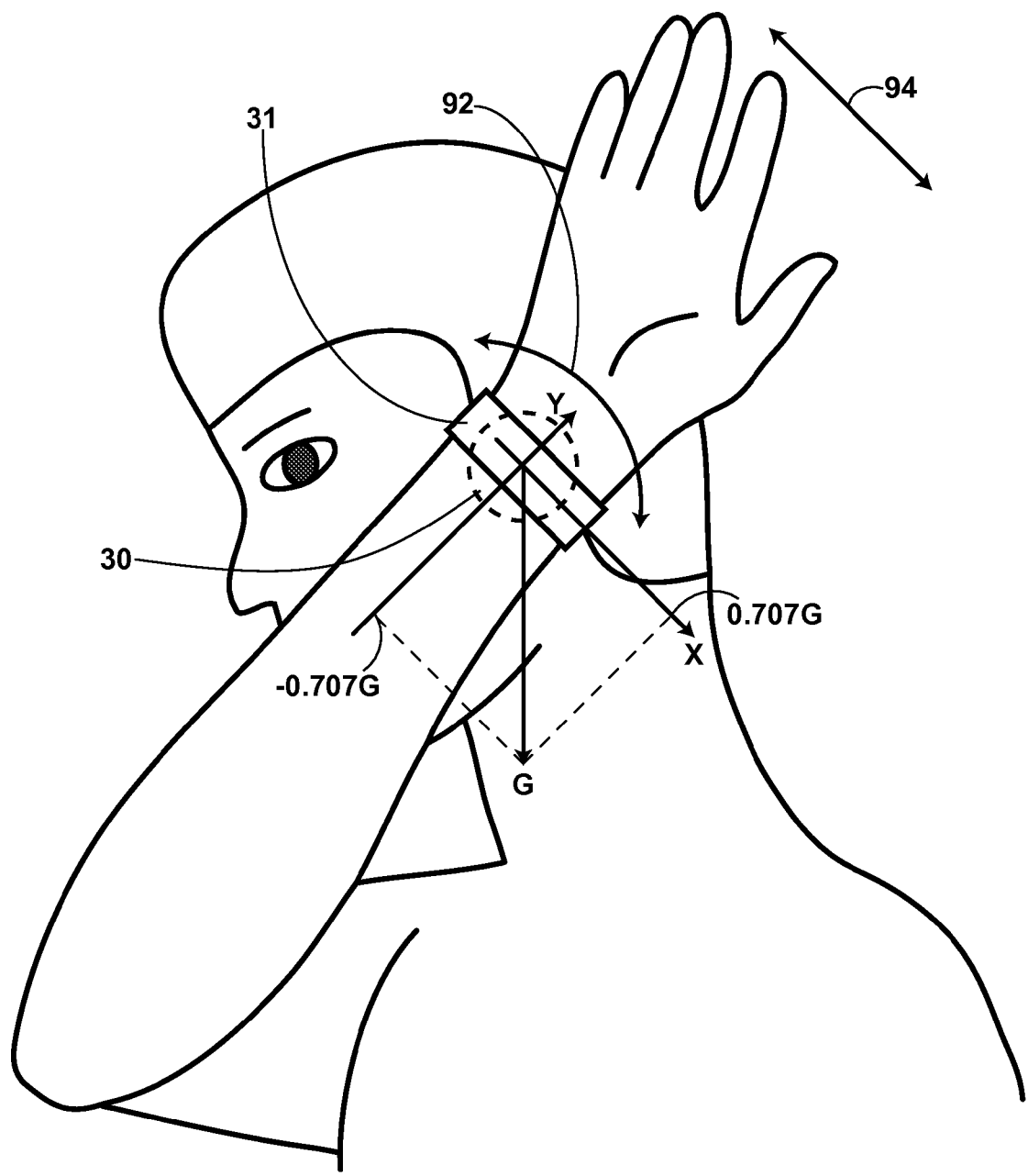
FIG. 7 is a graphical illustration of a possible orientation of the wrist-worn audio recorder for activating playback, in accordance with the first embodiment.

FIG. 7 illustrates a possible orientation of audio recorder 30 for activating playback of recorded audio data when audio recorder 30 is secured on the top of the right wrist by wristband 31. The user simply positions audio recorder 30 (illustrated by a dotted circle in FIG. 7) close to his or her ear, with the front surface of housing 33 (not shown in FIG. 7) of audio recorder 30 facing the ear. In this predetermined orientation of audio recorder 30, the sound volume of speaker 38 (FIGS. 1 and 3) is automatically adjusted to the appropriate level for listening to the recorded audio data in close proximity. The Z accelerometer signal component of the gravitational acceleration G here is almost zero (the Z-axis points into the figure and is nearly horizontal). Since the angle between the accelerometer X-axis and the direction of the gravitational acceleration G is about 45 degrees, the X accelerometer signal component of G is approximately G cosine 45°, which is equal to 0.707 G, as illustrated in the vector diagram in FIG. 7. Similarly, the angle between the accelerometer Y-axis and the gravitational acceleration G is about 135°, so that the Y accelerometer signal component is approximately G cosine 135°, which is −0.707 G. After sensing this combination of accelerometer signal components, recorder controller 48 (FIG. 3) of audio recorder 30 activates playback of a section of audio recording before the end of the audio-data record through speaker 38. A proximity sensor (not shown in FIG. 3), such as a capacitive, pyroelectric, pressure-sensitive, or electrical-conductive sensor, can be added to minimize accidental activation, so that playback only begins when audio recorder 30 is in this predetermined orientation and in close proximity (within 3 inches, for example) of or in contact with the skin of the ear or around the ear. Besides the orientation illustrated in FIG. 7, recorder controller 48 can also be designed to activate playback after detecting an orientation where the user positions audio recorder 30 close to his or her other ear for listening, where the user wears audio recorder 30 on the other side (i.e. the bottom) of the wrist, or where the user positions audio recorder 30 towards the ear of another person. When audio recorder 30 is playing back the audio-data record, the user can use predetermined patterns of wrist and arm movement to activate rewinding or fast forwarding as discussed below.

In FIG. 7, rotating of the wrist (and audio recorder 30) back and forth in a direction 92 in front of the ear (the rotating movement of the wrist is illustrated by the arrows at each end of direction line 92) produces a pattern of X- and Z-axis accelerometer signal changes while the Y-axis accelerometer signal remains essentially unchanged, because the angle between the Y-axis and the vertically downward direction of the gravitational acceleration G is nearly constant during this movement. Recorder controller 48 (FIG. 3) can detect these predetermined signal changes to activate rewinding for a short duration. Record controller 48 can also detect several back-and-forth rotations of the wrist in direction 92 in close succession to activate rewinding for a much longer duration.

Likewise, moving the wrist side-to-side in a direction 94 in front of the ear (the side-to-side movement of the wrist is illustrated by having an arrow at each end of direction line 94) produces a pattern of X- and Y-axis accelerometer signal changes while the Z-axis accelerometer signal component remains essentially unchanged, because the angle between the Z-axis and the vertically downward direction of gravitational acceleration G is nearly constant during this movement (the Z-axis points into the page and is nearly horizontal). Recorder controller 48 can detect these predetermined signal changes to activate fast forwarding for a short duration. Recorder controller 48 can also detect multiple side-to-side movements of the wrist in direction 94 in close succession to activate fast forwarding for a much longer duration. Similarly, recorder controller 48 can be designed to detect other movements of the wrist and arm to activate rewinding or fast forwarding. In all these cases, machine-learning algorithms can be used for more accurate and robust detection of predetermined movements from accelerometer signals.

For the case illustrated in FIG. 7, playback stops as soon as audio recorder 30 is moved away from the predetermined orientation in close proximity of the ear, and an indicator (40a, 40b, or 40c in FIG. 1) informs the user whether the playback stopped at the beginning, the end, or somewhere in the middle of the audio-data record. As in a typical audio recorder, starting audio recording before the end of tile audio-data record will overwrite previously stored audio data. When the audio data stored in audio recorder 30 is digital, as discussed above, and each section of recorded audio message is time-stamped by real-time clock 54 (FIG. 3), rewinding and fast forwarding can be accomplished almost instantly.

Figure 8:
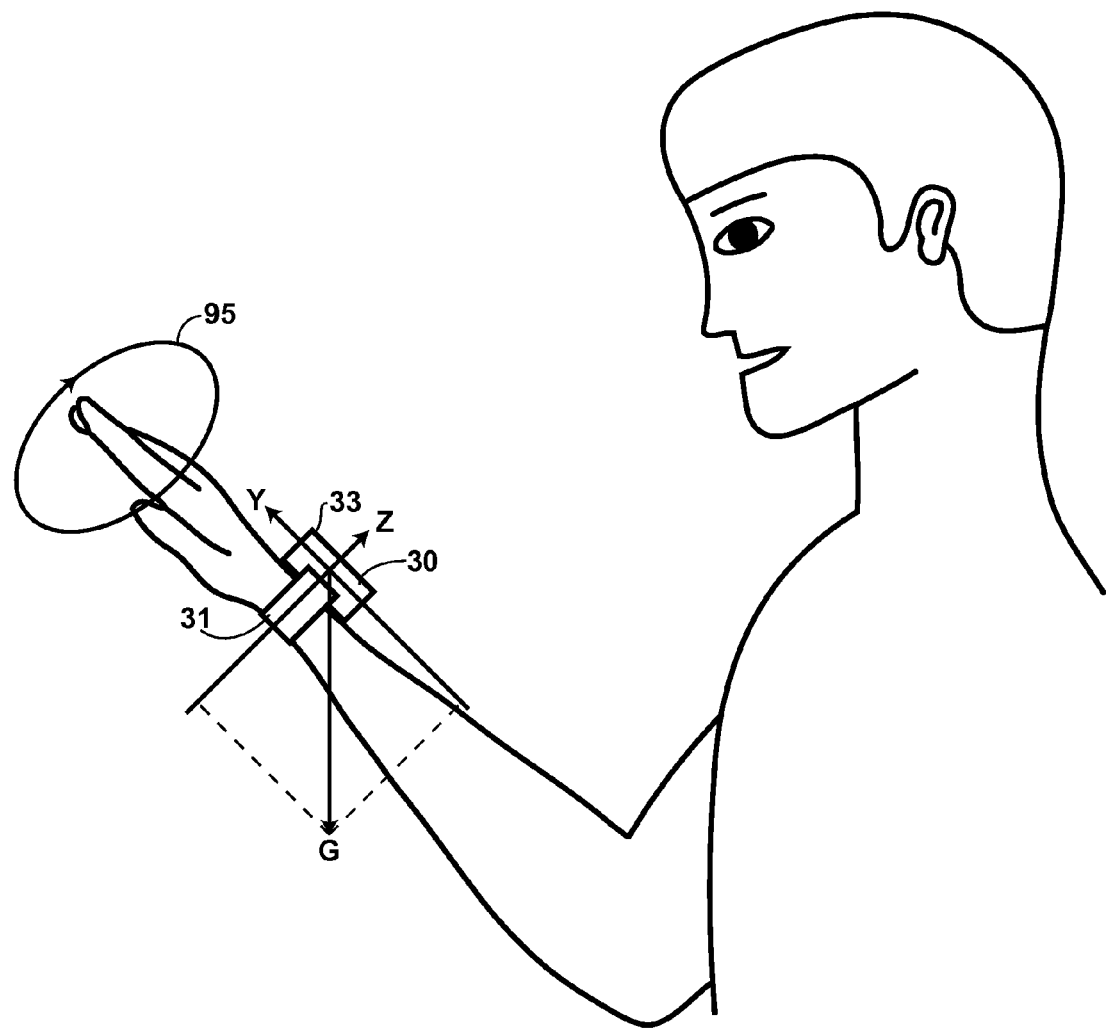
FIG. 8 is a graphical illustration of possible movements of the wrist-worn audio recorder for activating rewinding and fast forwarding, in accordance with the first embodiment.

FIG. 8 illustrates some other possible movements of the wrist and the forearm (and hence of audio recorder 30) for activating rewinding and fast forwarding of audio recorder 30. Audio recorder 30, with housing 33, is secured on top of the wrist here using wristband 31. In FIG. 8, the user positions his forearm at an angle of about 135 degrees between the forearm and the vertically downward direction of the gravitational acceleration G. Counterclockwise circular movement of the wrist (and also the hand and forearm) along a path 95 (in the direction of the arrow) produces a pattern of Y- and Z-axis accelerometer signal changes while the X-axis accelerometer signal component of the gravitational acceleration G is small, because the X-axis points away from the figure and is nearly horizontal. Recorder controller 48 (FIG. 3) can detect these predetermined signal changes to activate rewinding all the way to the beginning of the audio-data record, and an indicator (40a, 40b, or 40c in FIG. 1) turns on to inform the user of this action. Likewise, recorder controller 48 can detect clockwise circular movement of the wrist and forearm along path 95 (in the opposite direction of the arrow) to activate fast forwarding all the way to the end of the audio-data record, and a different indicator (40a, 40b, or 40c in FIG. 1) turns on to inform the user of this action. To minimize accidental activation of these audio-recorder functions by normal daily activities, recorder controller 48 can be designed to activate an audio-recorder function such as recording or playback only after audio recorder 30 remains in a static position for a predetermined period of time after a predetermined wrist and arm movement pattern has been detected.

Figure 9:
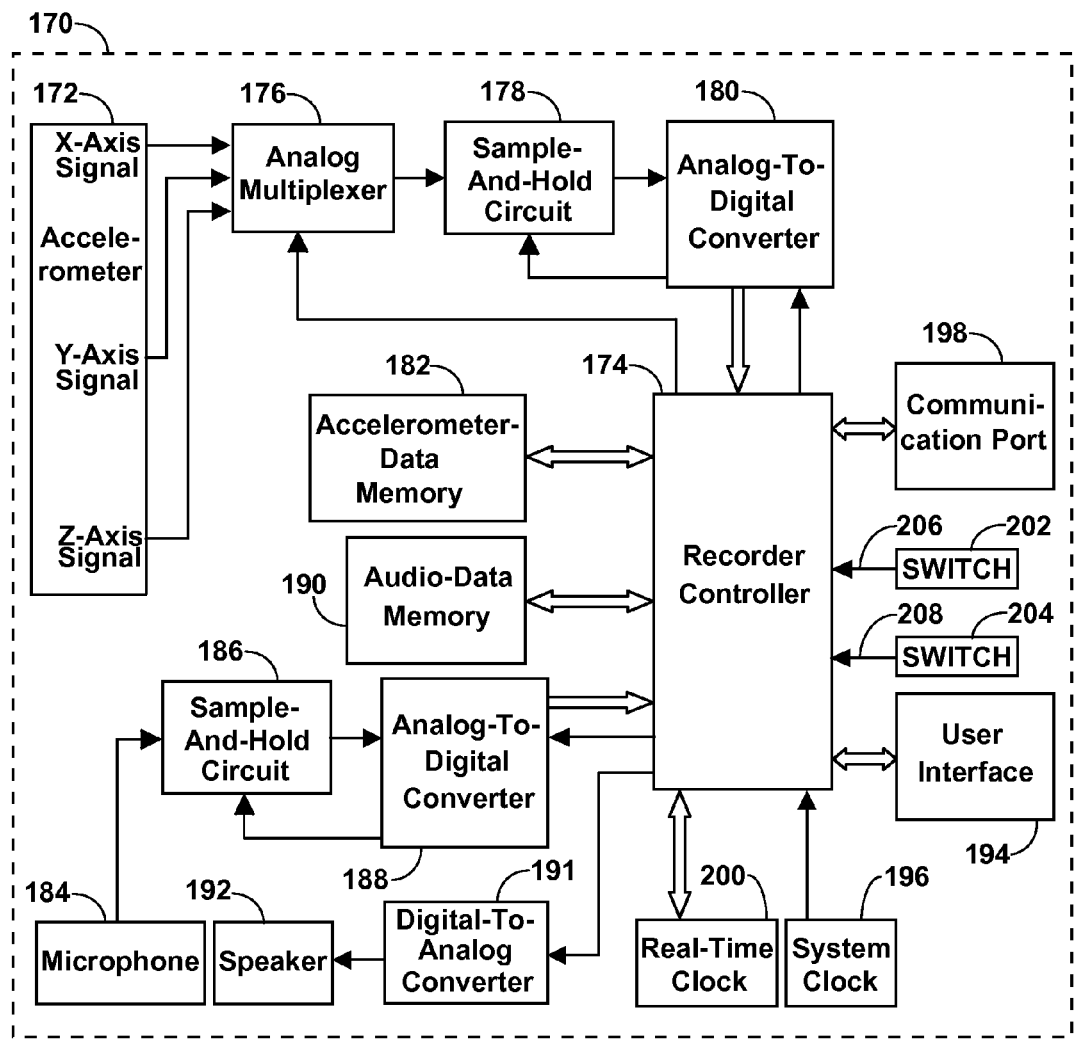
FIG. 9 is a schematic block diagram of a wrist-worn audio recorder, in accordance with the second embodiment.

FIGS. 9—Second Embodiment

The use of accelerometer-based orientation and/or movement sensing in a second embodiment for controlling a wearable electronic device is illustrated with a wearable audio recorder in FIG. 9, which is a block diagram of the audio recorder. The audio recorder of the second embodiment incorporates an accelerometer for sensing the orientation and/or movement (i.e. sequence of acceleration data) of the audio recorder, and a predetermined orientation and/or movement of the audio recorder activates playback of a reminding message. The reminding messages can be audio messages (i.e. voice messages, musical sounds, songs, alarms, or computer generated audio tones or messages) recorded in accordance with the first embodiment or in any other way, or they can be non-audio, such as vibration of the audio recorder.

In FIG. 9, a wrist-worn audio recorder 170 incorporates a three-axis accelerometer 172 for sensing the orientation and/or movement of audio recorder 170, and two switches 202, 204 for recording and verifying a reminding audio message. A recorder controller 174 plays back a reminding audio message when a predetermined orientation and/or movement of audio recorder 170 is detected. Each of the X, Y and Z analog signal components of accelerometer 172 is selected by an analog multiplexer 176 at predetermined time intervals, under the control of a recorder controller 174. Recorder controller 174 also activates an analog-to-digital converter 180, which uses a sample-and-hold circuit 178 to sample and hold the selected analog signal component. Analog-to-digital converter 180 converts the sampled analog signal component to the corresponding digital datum and sends the digital datum to recorder controller 174, which stores the digital datum in an accelerometer-data memory 182.

A microphone 194 is used for recording a reminding audio message when the user activates switch 202 to cause signal 206 at an input of record controller 174 to change from logic low to logic high (or vice versa). Under the control of recorder controller 174, the analog audio signal from microphone 184 is converted to digital audio data by a sample-and-hold circuit 186 and an analog-to-digital converter 188, and the digital audio data of the reminding audio message is stored in an audio-data memory 190. Audio-data memory 190 and accelerometer-data memory 182 can be RAM (random-access memory), flash memory, removable memory cards, or other types of digital memory. When recorder controller 174 detects a predetermined orientation and/or movement of audio recorder 170 a predetermined number of times, it sends the reminding audio message for the predetermined orientation and/or movement from audio-data memory 190 to a digital-to-analog converter 191 and a speaker 192 for playback. Tile user can also verify (i.e. manually use a switch to play back) a recorded reminding audio message by activating switch 204 to cause signal 208 at an input of record controller 174 to change from logic low to logic high (or vice versa). Additional switches may be used for recording and verifying more reminding audio messages. Instead of playing back a reminding audio message through speaker 192, recorder controller 174 can send the reminding audio message to an earphone or a processor (not shown in FIG. 9) through a communication port 198, or vibrate the audio recorder if a vibration mechanism (not shown in FIG. 9) is incorporated.

Communication port 198 facilitates wired or wireless communication between the audio recorder 170 and a processor, such as a personal computer or an earphone. Communication port 198 can be a wired or wireless USB port, a Bluetooth® wireless communication port, or any other wired or wireless communication port. Although FIG. 9 shows that accelerometer 172 senses accelerometer signal components in three orthogonal axes X, Y, and Z, accelerometer 172 may sense accelerometer signal components in a different number of axes to detect different predetermined orientations and/or movements. Sample-and-hold circuit 178 and analog-to-digital converter 180 are not required for an accelerometer that produces digital output data for the accelerometer signal components, and analog multiplexer 176 should be replaced with a digital multiplexer in this case. Furthermore, if accelerometer 172 is a single-axis accelerometer that produces only one signal component, the analog or digital multiplexer is not needed.

A user interface 194, which usually includes a display, LED indicators, and conventional switches, facilitates communication between audio recorder 170 and the user. A system clock 196 provides the operation timing for recorder controller 174, which is usually a microprocessor. Recorder controller 174 can be configured to perform mathematical computation, logic operation, timer function, storing and retrieving data using audio-data memory 190 and accelerometer-data memory 182, and reading and sending data through communication port 198, etc., as well known in the art. A real-time clock 200 provides time-keeping function, although audio recorder 170 can function without a real-time clock. In certain designs, real-time clock 200 is derived from system clock 196, so that a dedicated real-time clock 200 is not required.

In FIG. 9, two switches 202, 204 are used for recording and verifying a reminding audio message. Instead of switches 202, 204, accelerometer 172 may also be used to record a reminding audio message. For example, audio recorder 170 may activate recording after using accelerometer 172 to detect that it is in a predetermined orientation, as discussed in the first embodiment, or that it has completed a predetermined movement of the wrist, such as rotating the wrist (and thus audio recorder 170, located on the wrist) back and forth three times in close succession while audio recorder 170 is in front of the mouth (as illustrated in FIG. 6). If audio recorder 170 is also used as a regular audio recorder, the recorded reminding audio messages may be stored in a dedicated location of audio-data memory 190, so that they will not be overwritten by other recorded audio data. Furthermore, reminding audio messages can be recorded in audio recorder 170 during the manufacturing process of audio recorder 170 or received from a computer through communication port 198.

In the second embodiment, a recorded reminding audio message can be played back to remind the user of a predetermined type of physical activity, especially an undesired type of physical activity. For example, recorder controller 174 can be designed to detect the pattern of changes of X, Y, and Z accelerometer signal components produced by the wrist and arm movement of a user's hand when he or she puts snacks into his or her mouth, provided that the user wears audio recorder 170 on the wrist to detect such movement. When the wrist movement is repeated a predetermined number of times in a preset time window, recorder controller 174 activates playback of a reminding audio message to warn the user that he or she is eating too many snacks. With real-time clock 200 incorporated in audio recorder 170, recorder controller 174 can also be designed to play back a reminding audio message only when such repeated wrist movement is detected during the usual snack time of the user. In another example, wrist-worn audio recorder 170 can play back a different reminding audio message when the user has not moved his or her wrist (and audio recorder 170 on the wrist) very much over a period of time because of inactivity, such as when the user is watching television. This reminding audio message can help remind the user to stay active to prevent obesity, for instance.

After reminding messages are stored in audio-data memory 190 of audio recorder 170, audio recorder 170 can be attached to any part of the user's body, such as the waist or one of the lower extremities, to detect physical activity or inactivity there. For example, when audio recorder 170 is attached to the leg of a user who has restless leg syndrome, audio recorder 170 can play back a reminding audio message to the user when his or her leg is moving restlessly. Instead of playing back a reminding audio message through speaker 192, recorder controller 174 can also send the message to a wireless earphone (not shown in FIG. 9) such as a Bluetooth® earphone, through communication port 198, or activate a vibration mechanism (not shown in FIG. 9) if one is incorporated, so that the user is not embarrassed by unwanted people hearing the reminding audio message.

Figure 10:
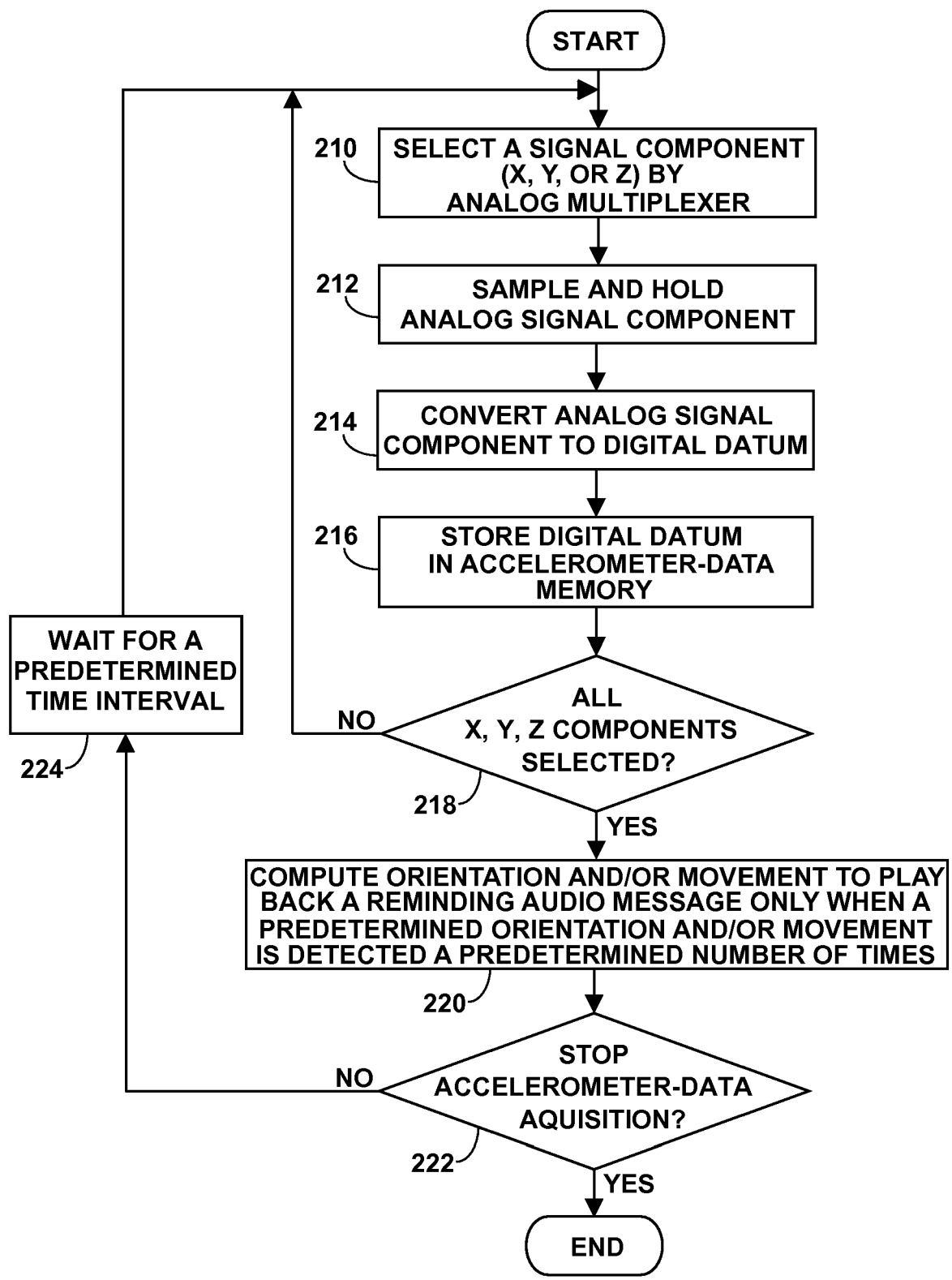
FIG. 10 is a flow diagram illustrating the orientation and/or movement detection operation of a recorder controller of the wrist-worn audio recorder, in accordance with the second embodiment.
Figure 11:
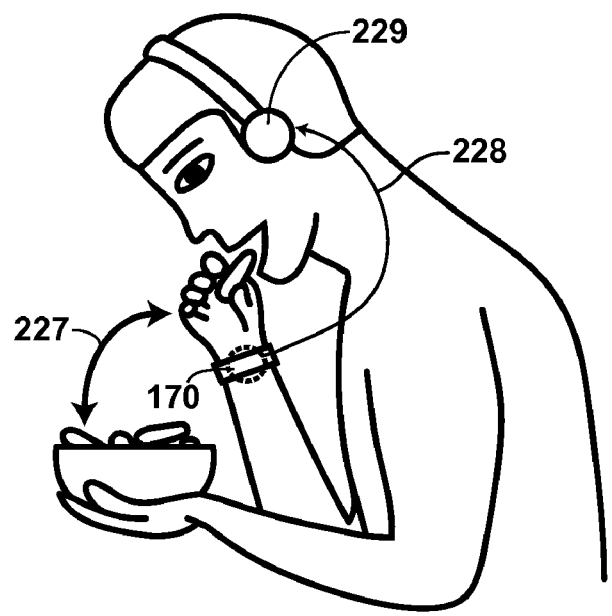
FIG. 11 is a graphical illustration of using a wrist-worn audio recorder to remind the user of eating too many snacks, in accordance with the second embodiment.
Figure 12:
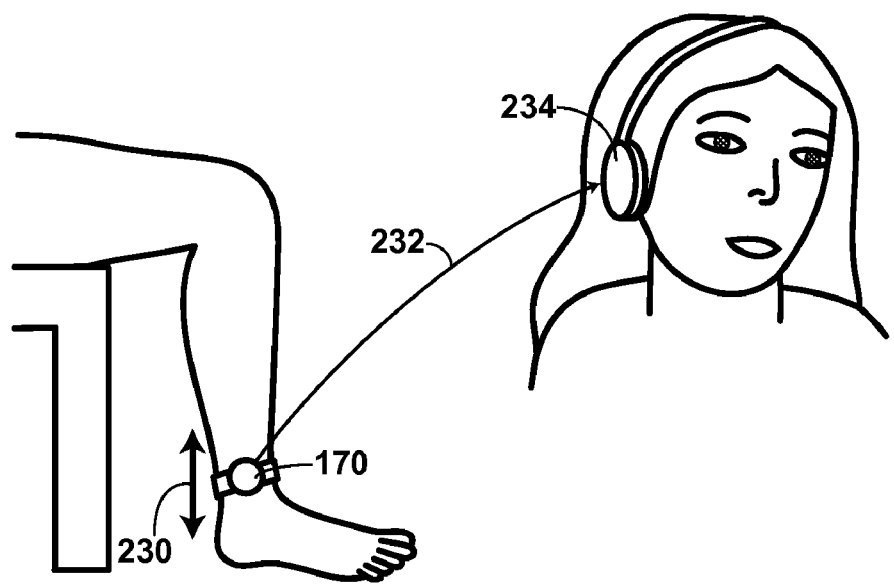
FIG. 12 is a graphical illustration of using a wrist-worn audio recorder to sense restless leg movement of the user and transmit a reminding audio message to the caregiver of the user, in accordance with the second embodiment.

Detection Operation—FIGS. 10, 11, and 12

FIG. 10 is a flow diagram illustrating the orientation and/or movement detection operation of recorder controller 174 (FIG. 9) for playing back a reminding audio message when a predetermined orientation and/or movement of audio recorder 170 (FIG. 9) is detected a predetermined number of times. In FIG. 10, after analog multiplexer 176 (FIG. 9), under the control of recorder controller 174, selects an accelerometer signal component (X, Y, or Z) at step 210, recorder controller 174 activates analog-to-digital converter 180 to use sample-and-hold circuit 178 (FIG. 9) to sample and hold the accelerometer signal component at step 212. At step 214, analog-to-digital converter 180 converts the sampled analog signal to the corresponding digital datum and sends the digital datum to recorder controller 174, which stores the digital datum in accelerometer-data memory 182 (FIG. 9) at step 216. At step 218, recorder controller 174 repeats this process for the next accelerometer signal component, until the X, Y, and Z accelerometer signal components have all been selected. If audio recorder 170 does not move too fast over each cycle of accelerometer-data acquisition, the acquired and stored X, Y, and Z signal data in each cycle are approximately simultaneous. Alternatively, separate data acquisition subsystems, each including a sample-and-hold circuit and an analog-to-digital converter, can be used for each of the three accelerometer-signal components to obtain more precisely simultaneous X, Y, and Z accelerometer signal data. At step 220, recorder controller 174 uses the data stored in accelerometer-data memory 182 to compute the orientation and/or movement of audio recorder 170 to playback a reminding audio message if the orientation and/or movement matches a predetermined orientation and/or movement for a predetermined number of times. At step 222, if the user does not stop accelerometer-data acquisition, recorder controller 174 waits for a predetermined time interval at step 224 and then returns to step 210 to repeat the above process.

FIG. 11 is a graphical illustration of using audio recorder 170 (behind the right wrist in FIG. 11, and illustrated by a dotted outline) to remind a user of eating too many snacks. When the user puts snacks into his or her mouth, recorder controller 174 (FIG. 9) of audio recorder 170 worn on the wrist detects the pattern of accelerometer signal changes of the X, Y, and Z components produced by a wrist movement 227 (the alternating movement of the wrist is illustrated by the arrows at each end of direction line 227). When wrist movement in direction 227 is repeated a predetermined number of times in a preset time window, recorder controller 174 activates playback of a reminding audio message to remind the user that he or she might be eating too many snacks. In FIG. 11, recorder controller 174 sends the reminding audio message through communication port 198 (FIG. 9) and the corresponding communication link 228 (wired or wireless) to an earphone 229, such as a Bluetooth® earphone, worn by the user, although recorder controller 174 may also play back the reminding audio message through speaker 192 (FIG. 9) or vibrate audio recorder 170 if a vibrate mechanism (not shown in FIG. 9) is incorporated. Alternatively, recorder controller 174 may send the reminding audio message to a wireless earphone worn by another person (not shown in FIG. 11), such as the parent of a child or the caregiver of an elderly, instead of the child or the elderly who wears audio recorder 170. Furthermore, recorder controller 174 can use real-time clock 200 (FIG. 9) to enable playback of a reminding audio message only when wrist movement 227 is detected a predetermined number of times during a predetermined time window, such as during the usual snack time for the person who wears audio recorder 170.

FIG. 12 is a graphical illustration of using audio recorder 170 to play back a reminding audio message when restless leg movement is detected. After an appropriate reminding audio message has been recorded in audio recorder 170, audio recorder 170 is attached to the user's right lower leg, as illustrated in FIG. 12. When the user moves his or her right leg restlessly in a direction 230 (the alternating movement of the leg is illustrated by the arrows at each end of direction line 230), recorder controller 174 (FIG. 9) detects the pattern of accelerometer signal changes of the X, Y, and Z components produced by the leg movement in direction 230. When leg movement in direction 230 is repeated a predetermined number of times in a predetermined time window, recorder controller 174 activates playback of the reminding audio message. Recorder controller 174 sends the reminding audio message through communication port 198 (FIG. 9) and the corresponding communication link 232 (wired or wireless) to an earphone 234 (a Bluetooth® earphone, for example) worn by another person, such as the parent of a child or the caregiver of an elderly, instead of the child or the elderly who wears audio recorder 170 on his or her right lower leg. Alternatively, recorder controller 174 may play back the reminding audio message through speaker 192 (FIG. 9), send the reminding audio message to an earphone worn by the person who wears audio recorder 170 on his or her right lower leg, or vibrate audio recorder 170 if a vibrate mechanism (not shown in FIG. 9) is incorporated. Furthermore, recorder controller 174 can use real-time clock 200 (FIG. 9) to enable playback of the reminding audio message only when leg movement is detected a predetermined number of times during a predetermined time window, such as during the usual rest time for the person who wears audio recorder 170.

Figure 13:
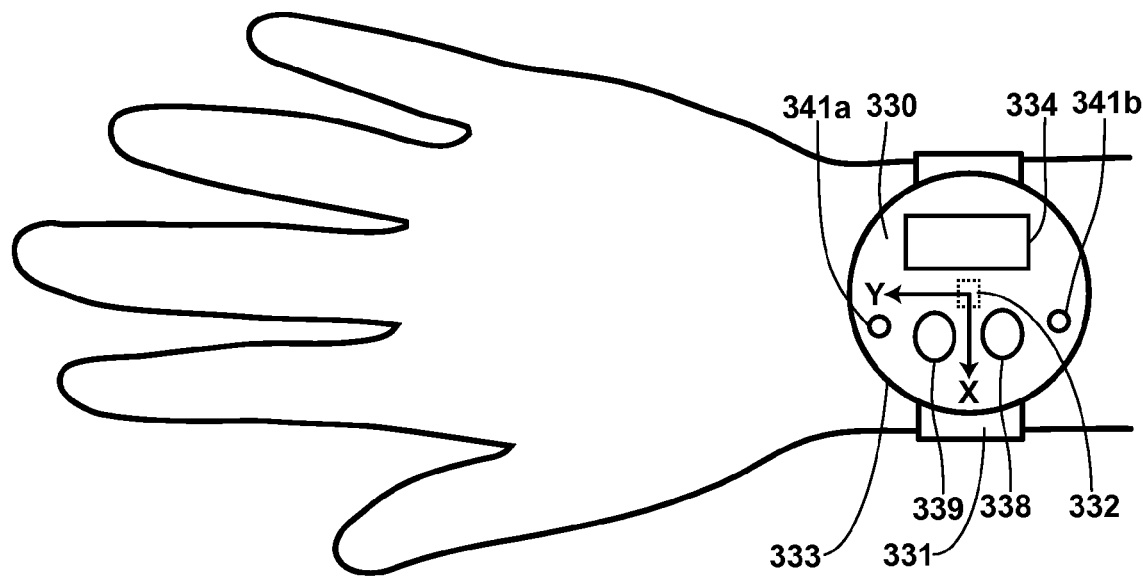
FIG. 13 shows a front view of a wristwatch incorporating a three-axis accelerometer in accordance with the third embodiment, illustrating the X- and Y-axes of the accelerometer.
Figure 14:
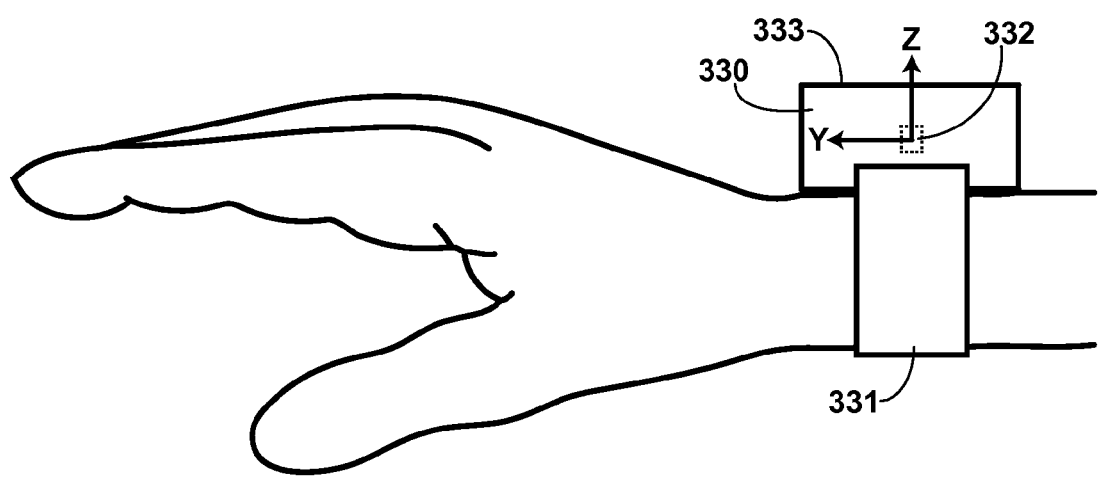
FIG. 14 shows a side view of the wristwatch of FIG. 13, illustrating the Y- and Z-axes of the accelerometer.
Figure 15:
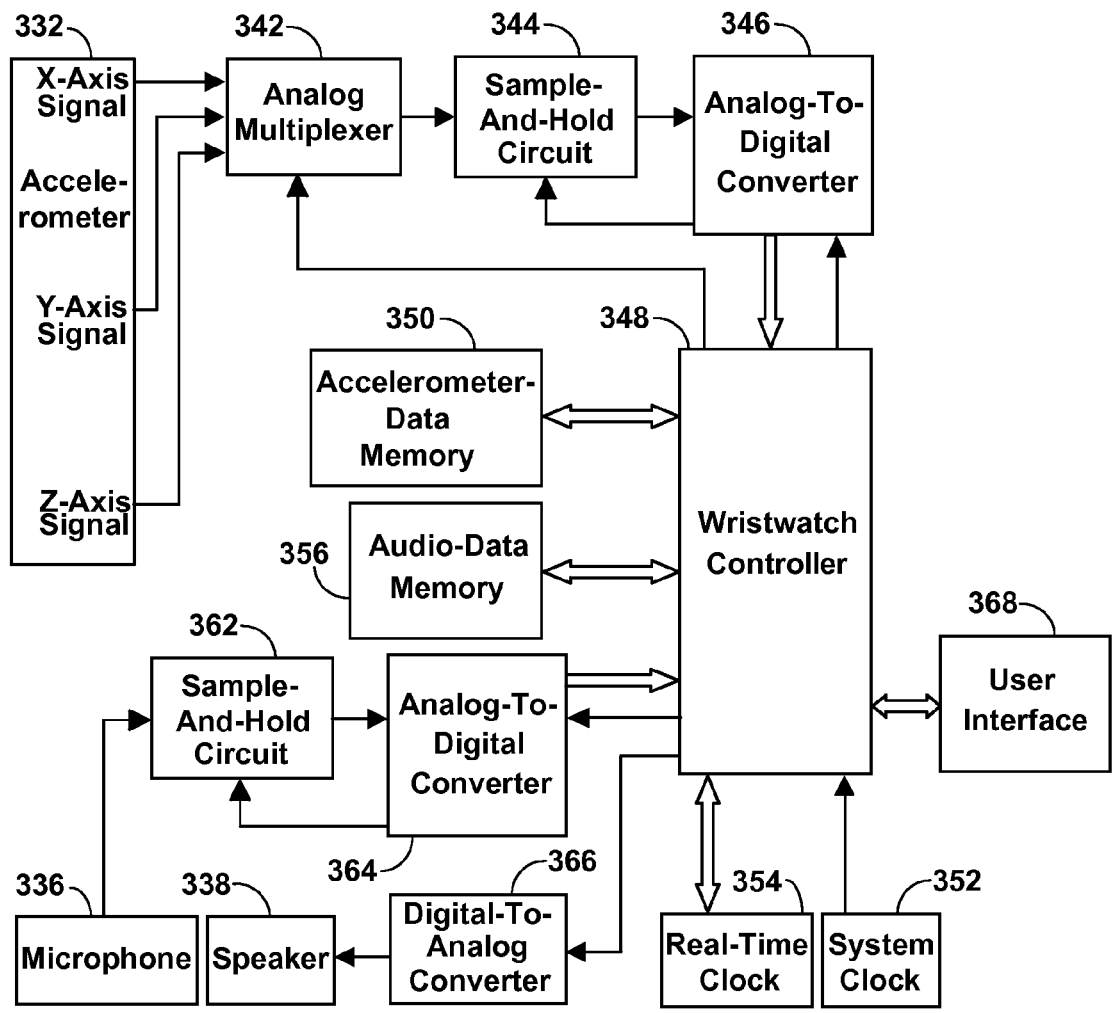
FIG. 15 is a schematic block diagram of the wristwatch of FIG. 13, in accordance with the third embodiment.

FIGS. 13, 14, AND 15—Third Embodiment

The use of accelerometer-based orientation and/or movement sensing in a third embodiment for controlling a wearable device is illustrated with a wristwatch. The wristwatch incorporates an accelerometer for sensing the orientation and/or movement of the wristwatch, and a predetermined orientation and/or movement of the wristwatch, such as the user moving it up and towards the ear, activates audio reporting of the time. This accelerometer-based time-reporting function can also be incorporated in other wrist-worn devices such as the voice recorder described in the first embodiment.

FIG. 13 shows a front view of a wristwatch 330 incorporating a three-axis accelerometer 332 inside a housing 333 of wristwatch 330. Three-axis accelerometer 332 is commonly also called a triaxial accelerometer, and it senses acceleration in the three orthogonal axes X, Y, and Z. In FIG. 13, accelerometer 332 is illustrated by a dotted outline, and the Z-axis points out of the page. Wristband 331 secures wristwatch 330 on top of the user's right wrist, although wristwatch 330 could also be secured on top of the user's left wrist. A display 334 on the front surface of wristwatch 330 shows the time of day (hours, minutes, seconds) or date (month, date, day) of wristwatch 330. Alternatively, the hands for the hours, minutes, and seconds of an analog display may be used to show the time of the day, in place of display 334. A speaker 338 is used for audio reporting of the time, and buttons 341a and 341b are used for functional control of the wristwatch, such as re-setting the time or setting an alarm. Microphone 339 allows the user to record personalized audio time components (i.e. "three", "forty", "minutes", "PM", etc.) for use in the audio time reporting, so that the reporting can be in a desired voice or language. Alternatively, standard time components recorded during manufacturing may be used for the audio time reporting. Other button arrangements and watch face displays may also be used.

FIG. 14 shows a side view of wristwatch 330 with accelerometer 332 (illustrated by a dotted outline) mounted inside housing 333 to sense the orientation and/or movement of wristwatch 330, and the X-axis points out of the page. Wristwatch 330 is secured on top of the wrist, using wristband 331. The X-, Y-, and Z-axis signals from a three-axis accelerometer such as accelerometer 332 provide information about the accelerometer's movement (which may be determined by a sequence of accelerometer signals, for example), and can also be separated into components of the vertical gravitational acceleration G to determine orientation when the accelerometer is at rest, so that a three-axis accelerometer can serve as both an orientation and movement sensor. In this way, wristwatch 330 uses the X-, Y-, and Z-axis acceleration signals of accelerometer 332 to detect specific orientations and/or movements of wristwatch 330 and subsequently activate the audio time reporting function of wristwatch 330.

FIG. 15 is a schematic block diagram of wristwatch 330 (FIGS. 13, 14). Each of the X-, Y-, and Z-axis analog signal components of accelerometer 332 is selected by an analog multiplexer 342 at predetermined time intervals, under the control of wristwatch controller 348. Wristwatch controller 348 also activates an analog-to-digital converter 346, which uses a sample-and-hold circuit 344 to sample and hold the selected analog signal component. Analog-to-digital converter 346 converts the sampled analog signal component to the corresponding digital datum and sends the digital datum to wristwatch controller 348, which stores the digital datum in an accelerometer-data memory 350.

Audio-data memory 356 stores audio data for each of the time components needed to report time (i.e. "three", "forty", "minutes", "PM", etc.). Alternatively, the wristwatch of the third embodiment can be incorporated with the voice recording function of the first embodiment or a conventional voice recording function to allow personalized recording of each of these audio time components, for example in a different voice or language. In either of these cases, a user records the personalized audio time components into a microphone 336, and the analog audio signal from microphone 336 is converted to digital audio data by a sample-and-hold circuit 362 and an analog-to-digital converter 364. Wristwatch controller 348 stores the digital audio data in audio-data memory 356, and it can subsequently send the digital audio data to a digital-to-analog converter 366 for personalized reporting of time from speaker 338. Audio-data memory 356 and accelerometer-data memory 350 can be RAM (random-access memory), flash memory, removable memory cards, or other types of digital memory. When wristwatch controller 348 detects a predetermined orientation and/or movement of wristwatch 330 (FIGS. 13, 14), such as moving the wristwatch towards the ear, it notes the current time from real-time clock 354 and sends the appropriate audio data (i.e. "two", "fifty", "one," and "PM", for 2:51 PM) from audio-data memory 356 to a digital-to-analog converter 366 and subsequently speaker 338 for audio time reporting to the user.

Although FIG. 15 shows that accelerometer 332 senses accelerometer signal components in three orthogonal axes X, Y, and Z, accelerometer 332 may sense accelerometer signal components in a different number of axes to detect different predetermined orientations and/or movements. Sample-and-hold circuit 344 and analog-to-digital converter 346 are not required for an accelerometer that produces digital output data for the accelerometer signal components, and analog multiplexer 342 should be replaced with a digital multiplexer in this case. Furthermore, if accelerometer 332 is a single-axis accelerometer that produces only one signal component, the analog or digital multiplexer is not needed.

A user interface 368, which usually includes a display 334 (FIG. 13) and switches (such as switches 341a, 341b (FIG. 13) and additional switches if necessary), facilitates communication between wristwatch 330 and the user, and provides a visual display of the time. A system clock 352 provides the operation timing for wristwatch controller 348, which is usually a microprocessor. Wristwatch controller 348 can be configured to perform mathematical computation, logic operation, timer function, storing and retrieving data using audio-data memory 356 and accelerometer-data memory 350, etc., as well known in the art. A real-time clock 354 provides time-keeping function.

Figure 16:
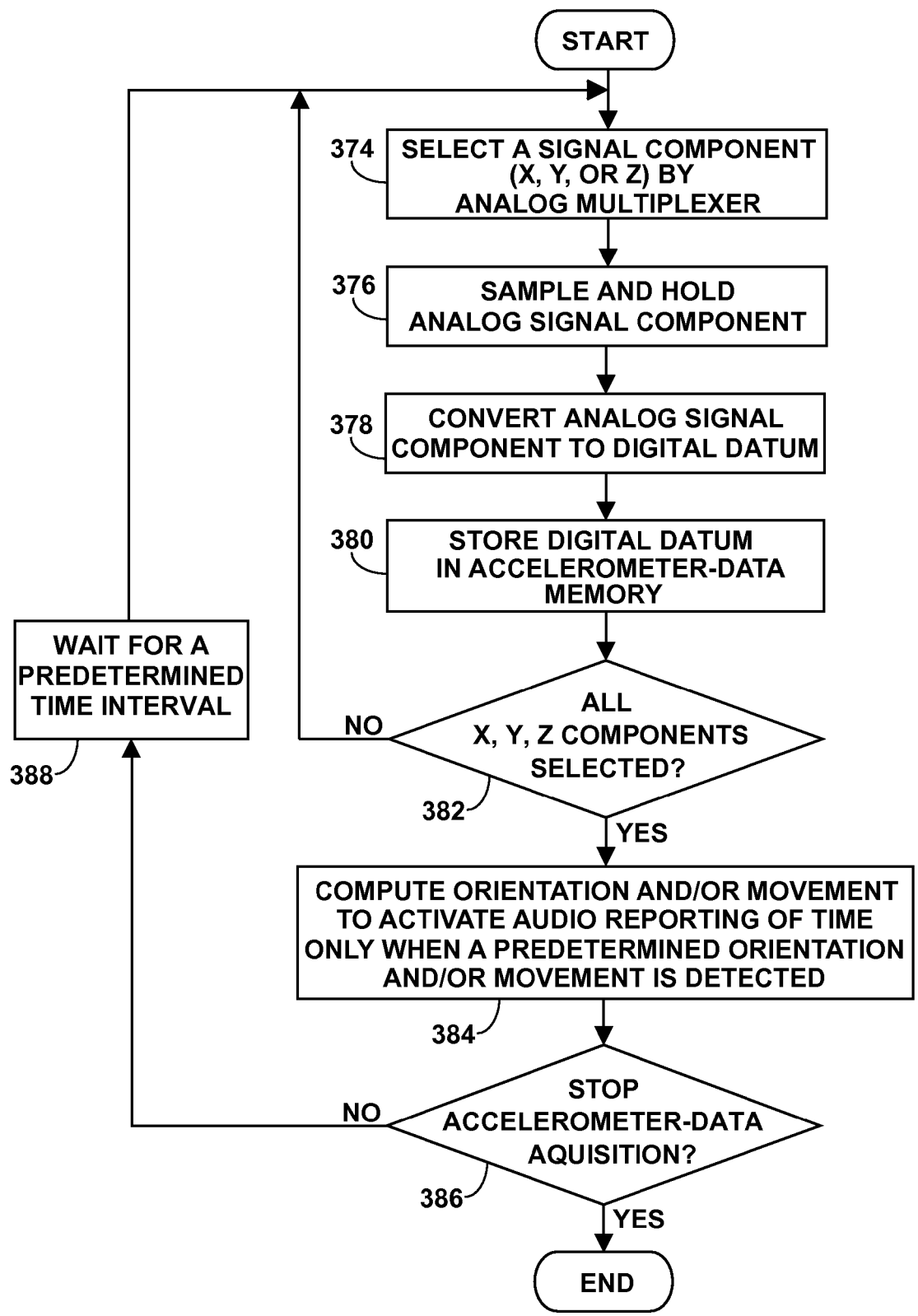
FIG. 16 is a flow diagram illustrating the orientation and/or movement detection operation of a wristwatch controller of the wristwatch, in accordance with the third embodiment.
Figure 17:
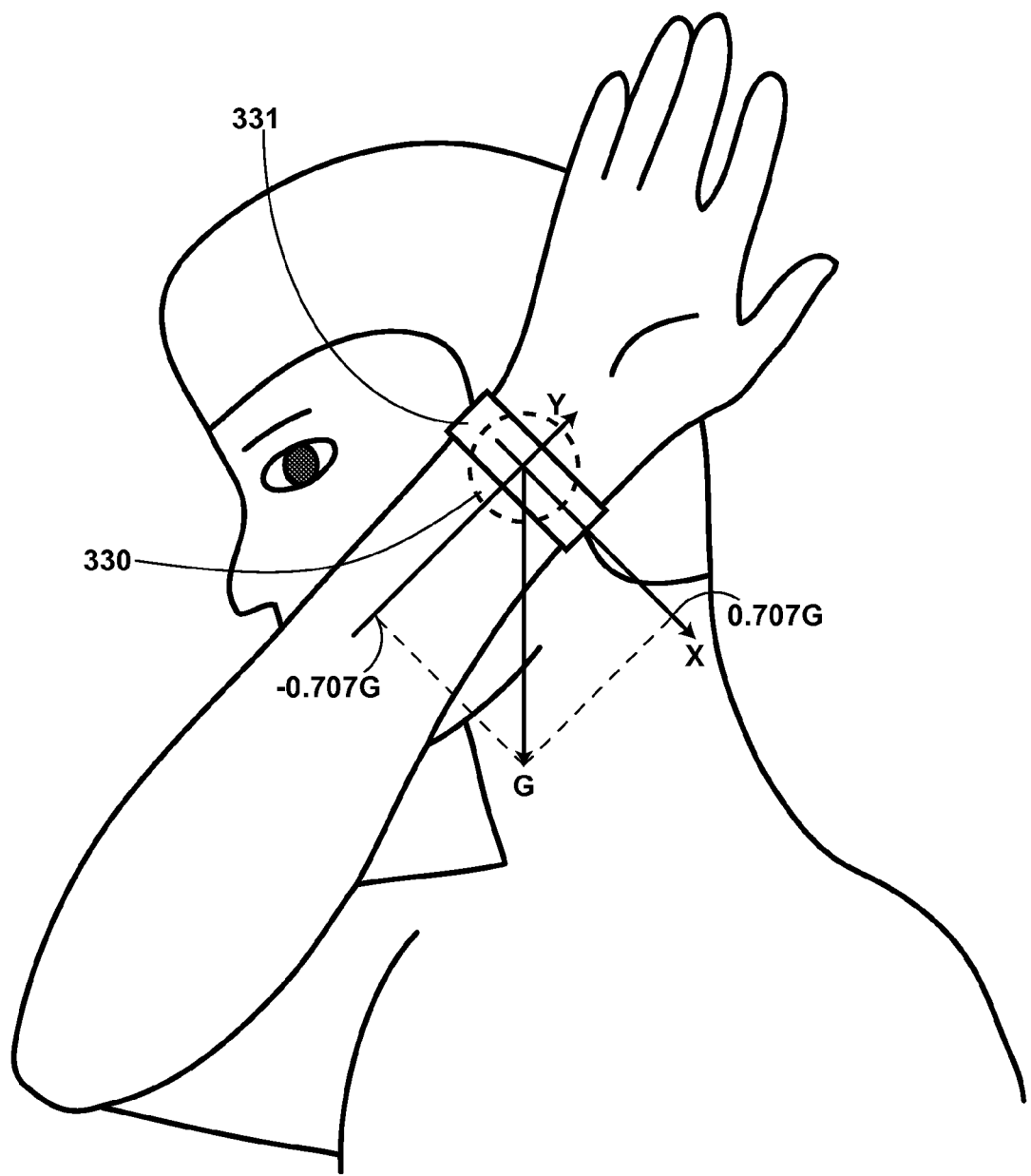
FIG. 17 is a graphical illustration of a possible orientation of the wristwatch for activating audio time reporting, in accordance with the third embodiment.

Detection Operation—FIGS. 16 and 17

FIG. 16 is a flow diagram illustrating the orientation and/or movement detection operation of wristwatch controller 348 (FIG. 15) for audio reporting of the time when a predetermined orientation and/or movement of wristwatch 330 (FIGS. 13, 14) is detected. In FIG. 16, after analog multiplexer 342 (FIG. 15), under the control of wristwatch controller 348, selects an accelerometer signal component (X, Y, or Z) at step 374, wristwatch controller 348 activates analog-to-digital converter 346 (FIG. 15) to use sample-and-hold circuit 344 (FIG. 15) to sample and hold the accelerometer signal component at step 376. At step 378, analog-to-digital converter 346 converts the sampled analog signal to the corresponding digital datum and sends the digital datum to wristwatch controller 348, which stores the digital datum in accelerometer-data memory 350 (FIG. 15) at step 380. At step 382, wristwatch controller 348 repeats this process for the next accelerometer signal component, until the X, Y, and Z accelerometer signal components have all been selected. If wristwatch 330 does not move too fast over each cycle of accelerometer data acquisition, the acquired and stored X, Y, and Z signal data in each cycle are approximately simultaneous. Alternatively, separate data acquisition subsystems, each including a sample-and-hold circuit and an analog-to-digital converter, can be used for each of the three accelerometer-signal components to obtain more precisely simultaneous X, Y, and Z accelerometer signal data. At step 384, wristwatch controller 348 uses the data stored in the accelerometer-data memory 350 to compute the orientation and/or movement of wristwatch 330 and activates an audio time reporting function if a predetermined orientation and/or movement is detected. At step 386, if the user does not stop accelerometer-data acquisition, wristwatch controller 348 waits for a predetermined time interval at step 388 and then returns to step 374 to repeat the above process.

FIG. 17 illustrates a possible orientation of wristwatch 330 for activating audio reporting of the current time when wristwatch 330 is secured on top of the right wrist by wristband 331. The user simply positions wristwatch 330 (illustrated by a dotted circle in FIG. 17) close to his or her ear, with the front surface of housing 333 (not shown in FIG. 17) of audio recorder 330 facing the ear. In this predetermined orientation of audio recorder 330, the sound volume of speaker 338 (FIGS. 13 and 15) is automatically adjusted to the appropriate level for listening to audio time reporting in close proximity. The Z accelerometer signal component of the gravitational acceleration G here is almost zero (the Z-axis points into the page and is nearly horizontal). Since the angle between the accelerometer X-axis and the direction of the gravitational acceleration G is about 45 degrees, the X accelerometer signal component of G is approximately G cosine 45°, which is equal to 0.707 G, as illustrated in the vector diagram in FIG. 17. Similarly, the angle between the accelerometer Y-axis and the gravitational acceleration G is about 135°, so that the Y accelerometer signal component is approximately G cosine 135°, which is −0.707 G. After sensing this combination of acceleration signal components, wristwatch controller 348 (FIG. 15) activates audio time reporting, so that the current time is reported using real-time clock information and standard or personalized time components from audio-data memory 356 (FIG. 15) through speaker 338. A proximity sensor (not shown in FIG. 15), such as a capacitive, pyroelectric, pressure-sensitive, or electrical-conductive sensor, can be added to minimize accidental activation, so that time reporting only occurs when wristwatch 330 is in this predetermined orientation and is in close proximity (within 3 inches, for example) of or in contact with the skin of the ear or around the ear. Besides the orientation illustrated in FIG. 17, wristwatch controller 348 can also be designed to activate audio time reporting after detecting an orientation where the user positions wristwatch 330 close to his or her other ear for listening, where the user wears wristwatch 330 on the other side (i.e. the bottom) of the wrist, or where the user positions wristwatch 330 toward the ear of another person.

Although the description above contains many specificities, these should not be construed as limiting the scope of the embodiments but as merely providing illustrations of some of the presently preferred embodiments. For example, the above-described embodiments can be modified by one skilled in the art, especially in the combination of various described features, without departing from the spirit and the scope of the embodiments.

Thus the scope of the embodiments should be determined by the appended claims and their legal equivalents, rather than by the examples given.

We claim:

1. A method for activating an audio-recorder function of a wearable audio recorder, comprising:
    (a) acquiring acceleration data of a wearable audio recorder; and
    (b) using said acceleration data to activate an audio-recorder function of said wearable audio recorder.

2. The method according to claim 1 wherein the step of using said acceleration data to activate an audio-recorder function of said wearable audio recorder comprises using said acceleration data to compute an orientation of said wearable audio recorder to activate an audio-recorder function when said orientation is a predetermined orientation.

3. The method according to claim 2 wherein said audio-recorder function is audio recording, and said predetermined orientation is an orientation of said wearable audio recorder in front of the mouth of a user who wears said wearable audio recorder on a wrist.

4. The method according to claim 2 wherein said audio-recorder function is playback of recorded audio data, and said predetermined orientation is an orientation of said wearable audio recorder in predetermined proximity of an ear of a user who wears said wearable audio recorder.

5. The method according to claim 1 wherein the step of using said acceleration data to activate an audio-recorder function of said wearable audio recorder comprises using said acceleration data to compute a movement of said wearable audio recorder to activate an audio-recorder function when said movement is a predetermined movement.

6. The method according to claim 1 wherein the step of using said acceleration data to activate an audio-recorder function of said wearable audio recorder comprises using said acceleration data to compute an orientation and a movement of said wearable audio recorder to activate an audio-recorder function when said orientation is a predetermined orientation and said movement is a predetermined movement.

7. The method according to claim 6 wherein said audio-recorder function is audio recording, said predetermined orientation is an orientation of said wearable audio recorder in front of the mouth of a user who wears said wearable audio recorder on a wrist, and said predetermined movement is a natural movement of said user's wrist wearing said wearable audio recorder for said user to move said wearable audio recorder to said predetermined orientation in front of the mouth of said user.

8. The method according to claim 6 wherein said audio-recorder function is playback of recorded audio data, said predetermined orientation is an orientation of said wearable audio recorder in predetermined proximity of an ear of a user who wears said wearable audio recorder on a wrist, and said predetermined movement is a natural movement of said user's wrist wearing said wearable audio recorder for said user to move said wearable audio recorder to said predetermined orientation of said wearable audio recorder in predetermined proximity of said ear of said user.

9. A wearable device, comprising:
(a) a wearable audio recorder;
(b) a three-axis accelerometer for acquiring acceleration data of said wearable audio recorder; and
(c) a detection means for using said acceleration data to activate an audio-recorder function of said wearable audio recorder.

10. The wearable device according to claim 9 wherein said detection means comprises a means for using said acceleration data to compute an orientation of said wearable audio recorder to activate an audio-recorder function when said orientation is a predetermined orientation.

11. The wearable device according to claim 9 wherein said detection means comprises a means for using said acceleration data to compute a movement of said wearable audio recorder to activate an audio-recorder function when said movement is a predetermined movement.

12. The wearable device according to claim 9 wherein said detection means comprises a means for using said acceleration data to compute an orientation and a movement of said wearable audio recorder to activate an audio-recorder function when said orientation is a predetermined orientation and said movement is a predetermined movement.

13. The wearable device according to claim 12 wherein said wearable audio recorder is a wrist-worn audio recorder.

14. The wearable device according to claim 9 wherein said detection means comprises a means for using said acceleration data to compute a movement of said wearable audio recorder to activate playing back of a reminding audio message after said movement matches a predetermined movement a predetermined number of times.

15. The wearable device according to claim 14 wherein said detection means further comprises a vibration mechanism, which vibrates said wearable audio recorder for reminding a user who wears said wearable audio recorder after said movement matches said predetermined movement said predetermined number of times.

* * * * *